United States Patent [19]

Pryor

[11] 4,266,793
[45] May 12, 1981

[54] BICYCLE HITCH DEVICE

[76] Inventor: Larry A. Pryor, 8458 S. 800 West, Wanatah, Ind. 43690

[21] Appl. No.: 91,266

[22] Filed: Nov. 5, 1979

[51] Int. Cl.³ .......................... B60D 1/06; B62K 27/00
[52] U.S. Cl. ..................................... 280/204; 280/488
[58] Field of Search .................. 280/204, 292, 406 R, 280/406 A, 446 B, 488, 489, 511

[56] References Cited

U.S. PATENT DOCUMENTS

| | | | |
|---|---|---|---|
| 2,709,604 | 5/1955 | Hartman | 280/489 X |
| 3,623,750 | 11/1971 | Allen | 280/488 |
| 4,077,646 | 3/1978 | Watkins | 280/204 |

FOREIGN PATENT DOCUMENTS 464351  4/1937  United Kingdom ..................... 280/204

*Primary Examiner*—John A. Pekar
*Attorney, Agent, or Firm*—Walter Leuca

[57] ABSTRACT

This invention is a hitch device particularly adapted for connecting a single wheel trailer to a bicycle. The ball member of the hitch device is connected to the bicycle frame. The cup member for coupling to the ball is connected to the end of the draw bar. The draw bar is provided with a depending lever, the distal end of which extends below the ball member. A bracket member is connected to the bicycle frame for anchoring one end of a spring member. The other end of the spring member is connected to the distal end of the depending lever. The distal end of the depending lever is in vertical alignment with the center of the ball, and the spring which is under a tension bias maintains this vertical alignment during the towing operation. The hitch device of this invention provides stability to the trailer and allows the bicycle to maintain its maneuverability.

9 Claims, 3 Drawing Figures

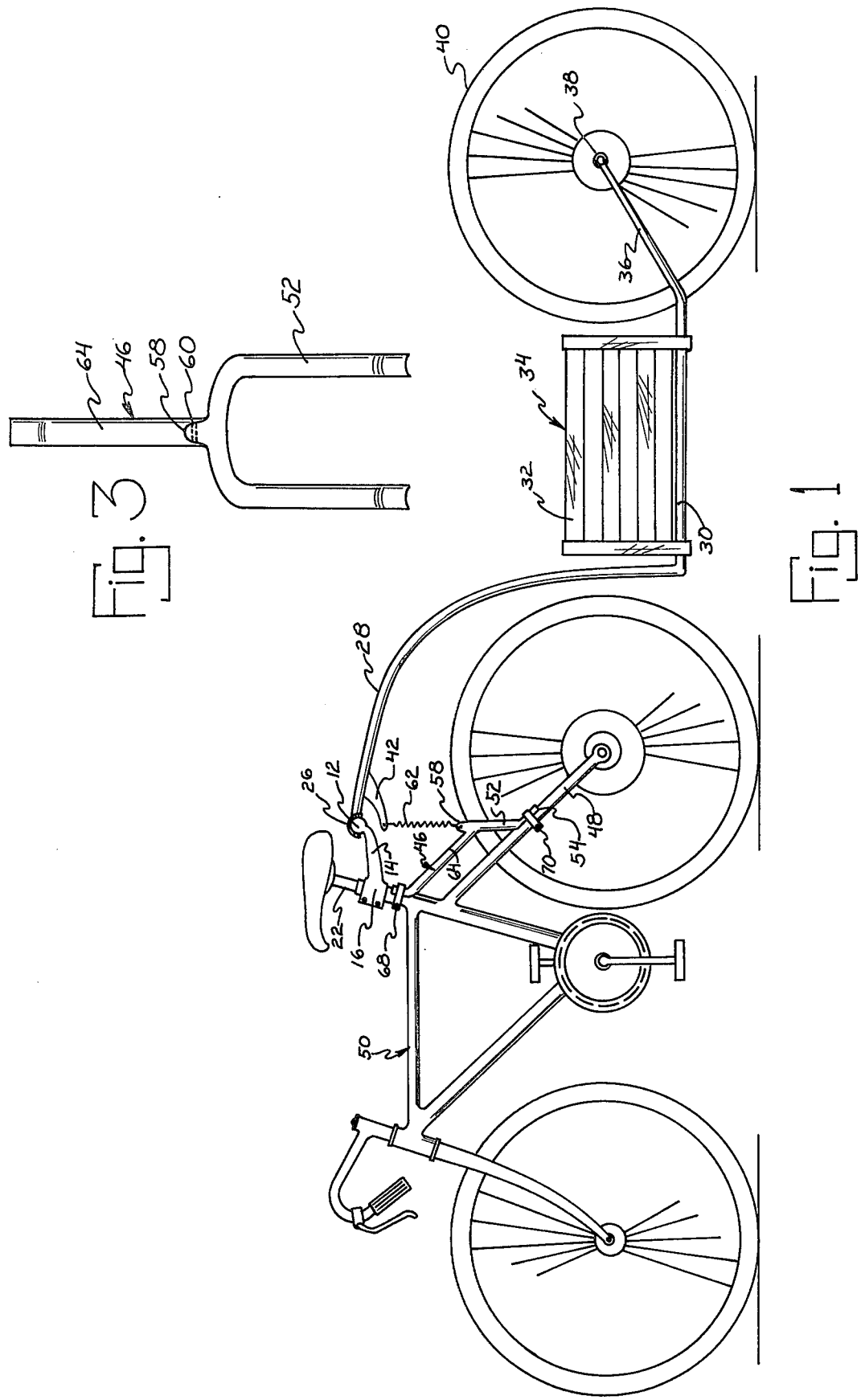

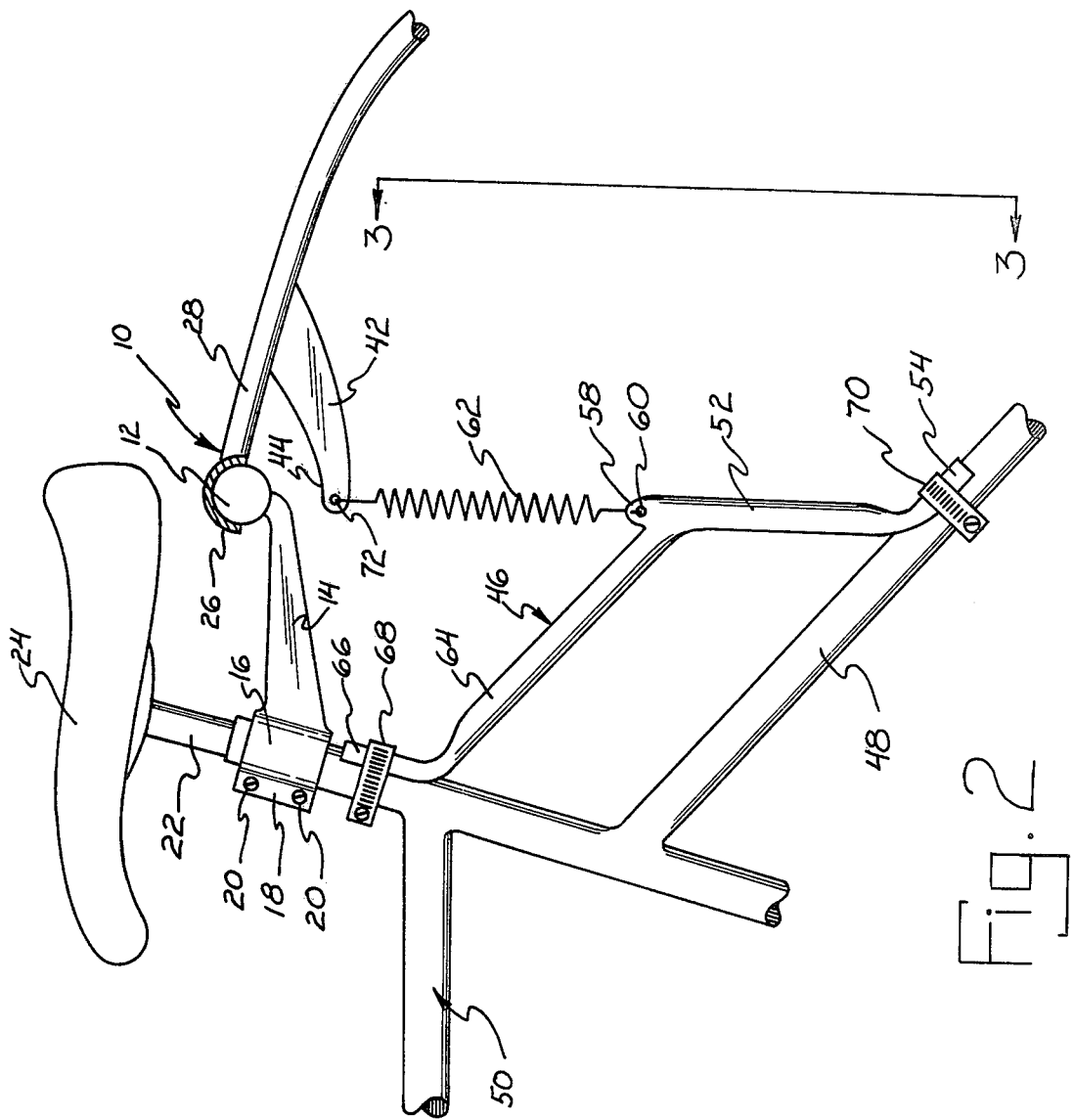

BICYCLE HITCH DEVICE

BACKGROUND OF THE INVENTION

1. Field of the invention

This invention relates generally to hitch devices and more particularly a hitch device for connecting a single wheel trailer to a bicycle.

2. Description of the Prior Art

Single wheel trailers connected tandem fashion to bicycles are known to the prior art but have not been successful in actual practice due to certain disadvantages. These disadvantages include lack of stability, diminution of maneuverability, complexity and cost. Prior art hitching devices for trailers which do not hinder maneuverability of the bicycle are not able to provide stability for a single wheel trailer. Hitching devices that provide stability to the trailer either diminish maneuverability to the bicycle or are complex and costly to manufacture and to operate.

SUMMARY OF THE INVENTION

Accordingly, I have invented a bicycle trailer hitch which is economical to manufacture, simple to attach and to operate, which further provides the required stability for a single wheel trailer that I contemplate using and at the same time does not hinder or diminish maneuverability of the bicycle. I accomplish the above by providing a coupling means comprising a ball and cup member connected to the bicycle frame and trailer draw bar respectively. I provide the draw bar of the trailer with a depending arm or lever, the distal end of which extends below the ball and cup connection, to which is connected a spring under tension and the other end thereof is connected to anchor means provided on the bicycle frame. The tension bias of the spring tends to keep the depending lever in the plane of the bicycle frame. The bias of the spring acting on the lever will always tend to right the trailer thereby providing stability to the trailer. The spring will readily allow for any sudden movement by the bicycle and not be hindered by the inertial mass of the trailer and allow for gradual recovery to equilibrium without diminishing maneuverability of the bicycle. The hitch device of this invention is economical to manufacture and easy to operate in that to connect or disconnect the trailer involves merely disconnecting the anchored end of the spring and lifting the cup from the ball.

Other objects and advantages of my invention will become apparent after a study of the detail description taken in reference to the accompanying drawings wherein is illustrated a preferred embodiment of my invention.

BRIEF DESCRIPTION OF THE DRAWINGS

FIG. 1 is a side elevation of the bicycle and single wheel tandem trailer connected together by means of my invention;

FIG. 2 is a detail elevation of the hitch of my invention shown in operative relation with the trailer and bicycle, both shown in fragment; and FIG. 3 is a detail end view of the spring anchor component of this invention taken along lines 3—3 of FIG. 2.

DESCRIPTION OF THE PREFERRED EMBODIMENT

Referring now more particularly to the drawing wherein a preferred embodiment of my invention is illustrated, numeral 10 designates generally the bicycle-trailer hitch embodying my invention. It comprises ball coupler 12 fixed to the distal end of arm 14. The other end of arm 14 is formed with a longitudinally open sleeve 16 provided with diametrically extending flanges 18 which are fitted with screw-nut connections 20 to clamp sleeve 16 against upstanding post 22 of the bicycle frame to which bicycle seat 24 is connected. Connected to ball coupler 12 for universal sliding engagement is semi-spherical cup member 26. Cup member 26 is fixed to the end of curve draw bar 28 of trailer 34. The other end thereof connects to frame 30 which supports container or carrier means 32 of bicycle trailer 34. Frame 30 is connected at its forward end to draw bar 28 by any convenient means and at its rearward end to bifurcated yoke member 36, the ends of which are provided with an axle 38 for journally supporting a single wheel 40.

Fixed adjacent the end of curved draw bar 28 is depending lever 42 formed so that the distal end 44 thereof extends vertically below the ball-cup coupling 12, 26. I further provide a spring anchor 46 which I illustrate as being a braced yoke member connected to the upstanding post 22 and the rear wheel frame of bicycle 50. Spring anchor 46 is formed to include a yoke component 52 having distal ends 54 and 56 adapted to seat on corresponding rear wheel frame bars 48 of bicycle 50. Lug 58 extending from the closed end of yoke component 52 is provided with hole 60 for anchoring the lower end of tension spring 62. Connecting yoke component 52 at the closed end thereof is brace member 64, the distal end 66 thereof being adapted to seat against upstanding post 22 of the bicycle frame. Spring anchor 46 is connected to the rear wheel frame bars 48 by any convenient means as for example pipe clamp members 68 and 70 to firmly secure the distal ends of yoke component 52 and brace member 64 of spring anchor 46. It should be understood that spring anchor 46 may be formed in a variety of shapes to accommodate differently constructed bicycles. The spring anchor 46 should be shaped and dimensioned to accommodate the corresponding upstanding post 22 and rear wheel frame bars 48 of the bicycle frame. The important feature of this invention is the provision of an anchored tension spring 62 to maintain the distal end 44 of lever 42 depending from the trailer draw bar 28 to which the other end of the spring is connected, vertically aligned below the center of ball-cup connection 12, 26. Depending lever 42 extends below ball 12 so that the distal end 44 thereof containing hole 72 to which is connected the other end of tension spring 62 is vertically aligned below the center of ball 12. The vertical alignment of the center of ball 12, the distal end 44 of depending lever 42, tension spring 62 and anchor lug means 58 provides stability for the single wheel trailer 34 and allows for maneuverability of bicycle 50.

In the operations of this invention, the ball arm component 14 and the spring anchor component 46 of this invention are clamped to the upstanding post 22 and rear wheel frame bars 48 or similar such members of bicycle frame. Cup member 26 is seated on ball 12. The ends of spring 62 are connected to hole 72 provided in distal end 44 of depending lever 42 and hole 60 in lug 58.

Spring 62 is formed with an adequate tension bias to provide the necessary component forces acting on depending lever 42 to automatically maintain lever 42 and therefore trailer 34 in a stable relationship with bicycle 50. I make the curvature of draw bar 28 acute so that frame 30 supports container means 32 at a level substantially the same as the axle of the bicycle wheels and closely adjacent the rear wheel of the bicycle. These dimensional features contribute to enhanced stability of the trailer and maneuverability of the bicycle.

To disengage hitch 10 of my invention, it is merely necessary to disengage spring 62 from its anchor hole 60 and remove cup member 26 from ball 12. The bicycle connecting components 14 and 46 of hitch device 10 may permanently remain connected to bicycle 50 since they are unobstructive and do not interfere with the normal operation of the bicycle.

I claim:

1. A hitch for a bicycle-trailer combination wherein the trailer is provided with a draw bar and cup member fixed to the distal end of said draw bar, the improvement comprising:
    an arm member having a ball member fixed to the distal end of said arm member;
    means formed at the other end of said arm member to connect to a frame component of the bicycle;
    a bracket member connected to a second frame component of the bicycle;
    the cup member fixed to the distal end of said draw bar mounted on said ball member;
    a lever member depending from said draw bar, the end thereof extending below said ball member; and
    a spring member connecting said bracket member and said end of said lever member, said spring member, said end of said lever member and said ball member being in vertical alignment.

2. A hitch for a bicycle-trailer combination wherein the trailer is provided with a draw bar and cup member fixed to the distal end of said draw bar, the improvement comprising:
    an arm member having a ball member fixed to the distal end of said arm member;
    means formed at the other end of said arm member to connect to a frame component of the bicycle;
    a bracket member connected to a second frame component of the bicycle;
    the cup member fixed to the distal end of said draw bar being mountable on said ball member;
    a lever member depending from said draw bar, the end thereof extending below said ball member; and
    a spring member connecting to said bracket member and said end of said lever member, said spring member being under a tension bias for maintaining said end of said lever vertically below said ball member.

3. A hitch for a bicycle-trailer combination wherein the trailer is provided with a draw bar and a cup member fixed to the distal end of said draw bar, the improvement comprising:
    an arm member having a ball member fixed to the distal end of said arm member;
    means formed at the other end of said arm member to connect to the frame of the bicycle;
    an anchor member connected to the frame of the bicycle;
    the cup member fixed to the distal end of said draw bar being mounted on said ball member;
    a lever member depending from said draw bar, the distal end thereof approximately vertically below said ball member; and
    a spring member connecting said anchor member and said distal end of said lever member.

4. A hitch for a bicycle-trailer combination is provided with a draw bar and a cup member fixed to the distal end of said draw bar, the improvement comprising:
    an arm member having a ball member fixed to the distal end of said arm member;
    means formed at the other end of said arm member to connect to the frame of the bicycle;
    an anchor member connected to the frame of the bicycle;
    the cup member fixed to the distal end of said draw bar mounted on said ball member;
    a lever member depending from said draw bar, the distal end thereof extending below said ball member; and
    a spring member connecting said anchor member and said distal end of said lever member, said spring member, said distal end of said lever member and said ball member being in approximate vertical alignment.

5. A hitch for a bicycle-trailer combination wherein the trailer is provided with a draw bar and a cup member fixed to the distal end of said draw bar, the improvement comprising:
    an arm member having a ball member fixed to the distal end of said arm member;
    means formed at the other end of said arm member to connect to the frame of the bicycle;
    an anchor member connected to the frame of the bicycle;
    the cup member fixed to the distal end of said draw bar being mounted on said ball member;
    a lever member depending from the draw bar, the distal end thereof extending approximately vertically below said ball member; and
    a spring member connecting said anchor member and said distal end of said lever member, said spring member extending between said distal end of said lever and said anchor member with a bias acting to maintain said ball member and said distal end of said lever in longitudinal alignment.

6. A hitch for a bicycle-trailer combination wherein the trailer is provided with a draw bar and a cup member fixed to the distal end of said draw bar, the improvement comprising:
    an arm member having a ball member fixed to the distal end of said arm member;
    means formed at the other end of said arm member to connect to the seat supporting frame component of the bicycle;
    a bracket member connected to a bicycle frame component of the bicycle;
    the cup member fixed to the distal end of said draw bar being mountable on said ball member;
    a lever member depending from said draw bar, the distal end thereof extending approximately vertically below said ball member; and
    a spring member connecting said bracket member and said distal end of said lever member, said spring member, said distal end of said lever member and said ball member being in longitudinal alignment.

7. A hitch for a bicycle-trailer combination wherein the trailer is provided with a draw bar and cup member fixed to the distal end of said draw bar, the improvement comprising:
- an arm member having a ball member fixed to the distal end of said arm member;
- means formed at the other end of said arm member to connect to the seat supporting frame component of the bicycle;
- a bracket member connected to a bicycle frame component of the bicycle;
- the cup member fixed to the distal end of said draw bar for mounting on said ball member;
- a lever member depending from said draw bar, the distal end thereof extending below said ball member, said ball member and said distal end being in vertical alignment; and
- a spring member connecting said bracket member and said distal end of said lever member.

8. A hitch for a bicycle-trailer combination wherein the trailer is provided with a draw bar and a cup member, the improvement comprising:
- an arm member having a ball member fixed to the distal end of said arm member;
- means formed at the other end of said arm member to connect to the frame of the bicycle;
- a cup member at the distal end of said draw bar being mounted on said ball member;
- a lever member extending from the draw bar, the distal end of said lever member being in approximately vertical alignment with said ball member; and
- a spring member connecting the frame of the bicycle and said lever member.

9. A hitch for a bicycle-trailer combination wherein the trailer is provided with a draw bar and a cup member, the improvement comprising:
- an arm member having a ball member fixed to the distal end of said arm member;
- means formed at the other end of said arm member to connect to the frame of the bicycle;
- a cup member at the distal end of said draw bar being mounted on said ball member;
- a lever member extending from the draw bar; and
- a spring member connecting the frame of the bicycle and said lever member, said spring member, said lever member and said ball member being in approximate vertical alignment.

* * * * *